2,840,528

METHOD OF PREPARING CATALYST FOR REFORMING GASOLINE

George Alexander Mills, Swarthmore, and Thomas Henry Milliken, Jr., Moylan, Pa., assignors to Houdry Process Corporation, Wilmington, Del., a corporation of Delaware No Drawing. Application January 26, 1956
Serial No. 561,659

2 Claims. (Cl. 252—442)

This invention relates to the preparation of a highly active form of platinum catalyst.

Heretofore, platinum catalysts have been prepared by numerous procedures. For example, an aqueous solution of chloroplatinic acid has been treated with hydrogen sulfide to form an aqueous suspension of colloidal platinum sulfide, which colloidal suspension has been mixed with an aqueous dispersion of gelatinous aluminum hydroxide. This gelatinous mixture has been dried and then dehydrated and transformed into particles of dehydrated alumina containing a minor amount of platinum sulfide distributed thereon. After reduction with hydrogen, such particles have served as a platinum-on-alumina catalyst.

In another prior art method of manufacture of noble metal catalysts, preformed particles of activated alumina, having the mechanical strength, heat resistance, crush resistance and related properties of activated alumina, have been the starting material. Suitable activated alumina particles have been impregnated with an aqueous solution of compound of the noble metal and thereafter reduced with hydrogen. Large quantities of granules of platinum catalyst have been manufactured by impregnating activated alumina particles with an aqueous solution of chloroplatinic acid, and reducing the chloroplatinate to metallic platinum by a hot stream of reducing gas such as hydrogen. The step of reducing the chloroplatinate to metallic platinum in the catalyst particles has sometimes been conducted in the catalyst bed of a hydrocarbon reforming unit at the petroleum refinery location instead of at the catalyst manufacturing plant.

One theoretical explanation why catalysts prepared from colloidally dispersed platinum sulfide have appeared less active than catalysts prepared from chloroplatinate-impregnated granules has emphasized the better distribution attainable from a solution than from a suspension, but convincing proof of the theory has not been available.

It has been known that the activity of a catalyst has been dependent not merely upon the quantity of platinum present, but also upon the method by which the catalyst was prepared. Numerous proposals have been made for modifying or combining previously described procedures for the preparation of a platinum containing catalyst but the extremely unpredictable nature of the differences in the performance of platinum catalysts has been such that the chemists familiar with methods for manufacturing platinum catalysts have been unable to formulate a set of rules correlating the various methods. Chemists familiar with the preparation of platinum catalysts have not even been able to predict the effect of some of the apparently minor modifications of steps upon the performance and/or activity of a finished catalyst. Only by empirical tests upon the finished catalyst has it been possible to evaluate the usefulness of a modification or step in the manufacture of a platinum catalyst.

After the reforming of gasoline over a platinum catalyst had been commercially introduced, the total quantity of catalytically treated gasoline in a few months surpassed the total quantity of platinum-treated material of all other varieties during previous decades. The greatly increased importance of platinum catalysts prompted petroleum refineries and catalyst manufacturers to be particularly active in the last few years in research efforts to improve the platinum catalysts for reforming gasoline. Nothwithstanding the extensive research, the increments of improvement were generally quite small.

Surprisingly, however, a very significant improvement has been achieved by applying the inventive concept of the present invention, that is, by: impregnating a granule of a suitable carrier with a soluble platinum compound: removing impregnant water from the granule at relatively severe drying conditions whereby the water content is reduced below 1 mg./m.$^2$ of surface area of the carrier; subjecting the impregnated, dried granule to a sulfiding gas at a temperature below 1000° F.; and thereafter treating the sulfided granules with a reducing gas such as hydrogen at a temperature within the range from 500° to 1000° F.

Not all of the reasons for the improved performance of the completed reforming catalyst are known. One theoretical explanation emphasizes that heretofore the step of reducing chloroplatinate impregnated granules may have involved the evolution of enough heat at the platinum sites to adversely affect platinum activity. According to this unproven theory, the intermediate sulfiding permits the avoidance of the troublesome exothermic reaction of hydrogen with the chloroplatinate impregnated into the dry carrier granule. In a catalyst granule containing only about 0.5% platinum, the heat capacity of the carrier obscures the heat of reaction at the sites of the platinum. Although the temperature of a catalyst bed may not be detectably affected by the chloroplatinate reduction, the highly exothermic nature of the reduction may have heretofore adversely affected the activity of the metallic platinum thus formed. By sulfiding the impregnated granule, and reducing the sulfided granule catalyst, no single reaction is so exothermic as to damage the activity of the resulting catalyst, according to such unproven explanation, which is not a necessary feature of the present invention.

In accordance with the present invention, a highly active form of catalyst granules effective for both the isomerization and dehydrogenation of hydrocarbons (e. g. effective in hydrogenatively reforming gasoline) is prepared by first forming granules of a suitable carrier having the dry, large surface area and mechanical properties to be expected of catalyst carrier granules; subsequently impregnating such granules with an aqueous solution of a platinum compound such as chloroplatinic acid (or, alternatively, diaminoplatinous nitrite or platinum bisethylenediamine or other water soluble platinum compound) whereby the granules contain from about 0.1 to about 2% platinum; subjecting the platinate-impregnated granules to drying conditions sufficiently severe to reduce the water content to not more than 1 mg./m.$^2$ (that is, one milligram of water per square meter of surface area of the carrier); subjecting the impregnated, dried granules to an atmosphere containing, as the principal reactant, a significant amount of sulfiding gas such as hydrogen sulfide, in an amount in excess of, and ordinarily many times in excess of, one sixth the weight of the platinum (thus ordinarily being greatly in excess of the stoichiometric amount theoretically necessary for converting all of the platinum compound to platinum sulfide but without asserting exactly what chemical compounds are formed), whereby the granule is sulfided; thereafter subjecting the thus sulfided particles to conditions favoring the formation of metallic platinum such as treatment with a stream of hydrogen having a hydrogen to hydrogen sulfide volume ratio of at least 20 to 1 at a temperature between about 500° F. and 1000° F.; and preparing the catalyst granules in such a manner (following any of a variety of methods) that they possess a controlled degree of isomerization activity, so that the completed catalyst provides commercially attractive yield-octane characteristics in the hydrogenative reforming of gasoline.

In preferred embodiments of the present invention, the step of sulfiding the impregnated activated alumina particles is conducted at a temperature of about 350° F. for a period of about 2 hours. In alternative embodiments of the invention, the sulfiding of the platinate-impregnated activated alumina particles may be conducted at an elevated temperature such as 900° F. for a relatively short period of time and/or at a moderate temperature for a somewhat longer period of time. The sulfiding temperature must not exceed 1000° F. inasmuch as excessive temperatures adversely affect both the platinum component and the carrier.

The dual-function catalyst having both isomerization function and a dehydrogenation function, and comprising platinum on an acidic carrier, and prepared with said intermediate gaseous sulfiding step, differs from a conventional dual-function catalyst prepared without the gaseous sulfiding but otherwise by the same series of steps. The evidence relating to the improved results in the reforming of gasoline with the catalyst benefiting from the gaseous sulfiding can be interpreted in several ways, and might indicate improved dehydrogenation activity and/or improved control of the isomerization activity of the carrier, and/or improved resistance to oxygen poisoning and/or other advantages.

After the granules have been subjected to the sulfiding gas, and prior to reduction, they can be handled substantially as chloroplatinate impregnated alumina particles are handled during storage and shipment. The sulfided granules are even less readily damaged. Sulfided granules of the present invention can be charged to a reforming unit for reduction in situ at the start-up of the gasoline reforming operation. If desired, the catalyst factory operations can include a step in which the sulfided granules are treated with a reducing gas, such as hydrogen, at a temperature sufficiently high to bring about a reduction and to form metallic platinum. The reduced catalyst granules contain such an active form of metallic platinum that upon exposure to atomspheric conditions some platinum oxide is ordinarily formed, thus necessitating a subsequent reduction to the metallic state.

It is desirable to control the temperature, hydrogen pressure, hydrogen sulfide pressure and hydrogen to hydrogen sulfide ratio at which the sulfided granules are reduced. In the development of the present invention, experimental evidence indicated that, in order to obtain rapid, complete, and satisfactory reduction of a finely divided, large area sample of platinum sulfide to a catalytically active form of metallic platinum at a temperature below 1000° F., the hydrogen to hydrogen sulfide volume ratio in the reducing zone must be at least 20 to 1. The sulfided granules must be reduced in an atmosphere containing a hydrogen to hydrogen-sulfide ratio of at least 20 to 1. The larger the hydrogen to hydrogen sulfide volume ratio, the lower the temperature at which catalytically active granules can be formed. Superatmospheric hydrogen pressure is advantageous but not necessary for the reduction of the sulfided granules. The temperature of reduction must be at least 500° F. to obtain an active catalyst. Ordinarily the reduction is satisfactorily complete in one or two hours.

The intermediate step of sulfiding the impregnated, dried granule is advantageous in the preparation of substantially any type of platinum catalyst for hydrogenative upgrading of gasoline and any of a wide variety of methods may be employed to impart the isomerization function to the carrier. One may employ, as the carrier in the improved catalyst, a partially deactivated silica-alumina cracking catalyst, or a cracking catalyst depleted by prolonged use, or an activated alumina containing a weight of chloride approximately equal to the weight of platinum, or other carrier having an acid function balanced with the platinum function to provide attractive yield-octane performance in gasoline reforming.

The carrier should be prepared in accordance with the best practices known for that type of carrier. For example, the method of U. S. Patent 2,723,947, describing the leaching activated alumina particles to remove less than 10% alumina, should be employed when activated alumina granules provide the carrier granules. The carrier must have a surface area of at least 5 m.$^2$/g., and if alumina, must have a surface area of at least 40 m.$^2$/g.

After the reduction of the sulfided granules, either during the catalyst factory operations, or during the start-up of the reforming operation, the catalyst may be utilized in a reforming operation very similar to that heretofore employed with other varieties of platinum reforming catalysts. However, by reason of the increased activity of the catalyst which has undergone the intermediate gaseous sulfiding stage, a given octane level of reformate can be achieved at a lower temperature, a higher space rate and/or a smaller weight of catalyst for a reforming unit of a given capacity than has heretofore been standard practice.

Particular attention is directed to the important advantage that the sulfided catalyst possesses greatly increased resistance to poisoning or deactivation by minor amounts of poisons such as oxygen, steam or ammonia during the start-up of a reforming unit, and during such start-up is quite superior to the corresponding chloroplatinate catalyst.

Reference is made to a series of examples which illustrate some of the phenomena pertinent to the present invention.

EXAMPLE I

Granules of activated alumina having a surface area of about 80 m.$^2$/g., were treated with an aqueous solution of chloroplatinic acid to impregnate the outer surface of the activated alumina granules with chloroplatinate corresponding to about 0.5% platinum. These impregnated pellets were heated to a temperature of about 350° F. for about 1 hour to remove excess water and to form dried activated alumina granules impregnated with chloroplatinate. The water content of the thus dried granules was significantly less than 80 mg./g. and thus was less than 1 mg./m.$^2$ surface area of the carrier. The dried granules were then treated with a stream consisting of 75% nitrogen and 25% hydrogen sulfide at a temperature of about 350° F. for 1 hour, during which the granules were subjected to a quantity of hydrogen sulfide in excess of 10 times the weight of the platinum content of the granules. Although a reaction of hydrogen sulfide with chloroplatinate might release hydrogen chloride under some conditions, measurements indicated that no significant amount of hydrogen chloride gas was volatilized during the sulfiding of the dried, activated alumina granules.

The sulfided granules were heated in nitrogen to 850° F., and a stream of hot hydrogen gas was passed over the granules for three hours at 900° F. to form reduced granules. In other runs, the isothermal unit was purged with nitrogen at 850° F., and then cooled before hydrogen was passed into the catalyst bed. A series of tests established that the catalyst bed must be at a temperature above 500° F. in order for the hydrogen to bring about the formation of an active catalyst. The catalyst prepared by the intermediate sulfiding, when employed in a laboratory isothermal apparatus as a reforming catalyst, made possible the attainment of results superior to those achieved by the use of reforming catalyst prepared without the intermediate sulfiding but otherwise by the same procedure. In Table 1 are data for the reforming of the same naphtha at identical process conditions over catalysts prepared by methods which differ only as regards the use of the herein described intermediate sulfiding treatment for the catalyst of Series B.

*Table 1*

[Reforming of heavy East Texas naphtha at 600 p. s. i. g. and H₂: Oil ratio of 6.]

| Temp. | LHSV | Series A— Unsulfided Catalyst | | Series B— Sulfided Catalyst | | Improvement in Octane |
|---|---|---|---|---|---|---|
| | | Octane | Yield | Octane | Yield | |
| 900° F | 4 | 78.5 | 87.5 | 84.5 | 85.0 | 6.0 |
| 925° F | 4 | 86.5 | 81.5 | 90.5 | 80.5 | 4.0 |
| 950° F | 6 | 90.0 | 80.5 | 93.0 | 80.5 | 3.0 |

The unsulfided catalyst of Series A was a commercially available reforming catalyst.

These comparative data establish that in a laboratory isothermal reforming apparatus, the sulfiding step enhances the activity of the catalyst enough to obtain a reformate from about 3 to about 6 octane members superior to what would be obtained without the intermediate sulfiding.

EXAMPLE II

Sulfided and unsulfided granules were prepared as in Example I and designated Catalysts D and C respectively. Both catalysts were reduced at 100 p. s. i. g. at 850° F. in a hydrogen atmosphere containing 1 mol percent steam. The dehydrogenation activity of each catalyst was measured by the standard test for the conversion of cyclohexane to benzene. Catalyst D which had benefited from the sulfiding treatment had the excellent rating of 79%, but Catalyst C had a poor rating of 66%. These tests indicated that the sulfided catalyst was significantly more resistant to steam poisoning during the reduction step than catalysts corresponding to commercially marketed reforming catalysts.

EXAMPLE III

In a pilot plant operating at adiabatic conditions similar to a commercial reforming unit, tests were conducted to determine the effect of the intermediate sulfiding step upon the performance of the catalyst. The pair of comparison-catalysts were prepared as described in Example I.

A heavy East Texas naphtha (a laboratory reference naphtha designated as HETN) having an F1 clear octane number of 36.7, and containing 46.4% paraffins, 16.5% aromatics, 4% $C_5$ naphthenes, 24.6% $C_6$ naphthenes and 8.5% by volume polycyclic naphthenes, had volatility characteristics such that in an ASTM distillation the 5% B. P. was 286° F. and the 95% B. P. was 363° F.

A stream of a mixture of said HETN, recycle gas and 100 parts of HCl per million parts by weight of naphtha was passed through the pilot plant for 60 hours to obtain the following data in the use of the catalyst which had been prepared with the intermediate sulfiding step;

*Table 2*

| Hours | 6–18 | 20–32 | 34–46 | 48–60 |
|---|---|---|---|---|
| ° F | 875 | 900 | 925 | 950 |
| Vol. percent $C_5$ plus | 89.8 | 84.8 | 80.0 | 75.2 |
| F1 clear octane | 82.0 | 91.3 | 97.3 | 100.5 |

Such conditions as 500 p. s. i. g. pressure, 2.9 liquid volumes per hour per volume of catalyst, and recycle gas to oil mol ratio of 10.3 were maintained substantially constant.

Using the same reference stock in the same pilot plant to test an unsulfided catalyst provided $C_5$ plus reformate of lower octane number as follows:

*Table 3*

[F1 clear octane number of $C_5$ plus reformate in adiabatic pilot plant.]

| ° F | 875 | 900 | 925 | 950 |
|---|---|---|---|---|
| Unsulfided catalyst | 75.0 | 86.5 | 93.3 | 98.0 |
| Sulfided catalyst | 82.0 | 91.3 | 97.3 | 100.5 |
| Octane advantage | 7.0 | 4.8 | 4.0 | 2.5 |

These data established that under adiabatic pilot plant conditions, an octane gain of from about 2 to 7 could be achieved by subjecting the dried, impregnated granules to a gaseous sulfiding treatment prior to reduction.

The yield-octane curves for unsulfided catalyst and for the catalyst prepared with said intermediate sulfiding treatment were substantially the same, and the improved catalyst had the advantage of being more active, whereby a higher octane reformate was obtained at the same conditions without any sacrifice in the yield-octane relationships. Using the unsulfided catalyst, the 75.0, 86.5, 93.3 and 98 octane $C_5$ plus reformates were obtained in 92.0, 87.5, 83.0 and 78% yields respectively. Based upon the thus proven superiority of the catalyst prepared with said sulfiding treatment, a reforming unit of a given capacity at certain octane levels might require a weight of the improved catalyst corresponding to about 65% to 70% of the unsulfided catalyst. The scaling down of the entire reforming unit by reason of the more active catalyst makes possible a significant saving in overall capital investment.

The stability of a reforming catalyst is partly dependent upon the purity of the hydrogen in the recycle gas. A further advantage of the improved catalyst involves its ability to form purer hydrogen at a given octane level.

*Table 4*

[Hydrogen purity at various octane levels.]

| Unsulfided Catalyst | | Sulfided Catalyst | |
|---|---|---|---|
| Octane | H₂ Purity | Octane | H₂ Purity |
| 100.2 | 75.7 | 100.5 | 76.8 |
| 93.5 | 82.5 | 97.3 | 81.5 |
| 86.7 | 87.0 | 91.3 | 86.0 |
| 75.1 | 91.5 | 82.0 | 90.7 |

These data provided a basis for expecting the stability of the catalyst in which the impregnated, dried granules were treated with a gaseous sulfiding agent prior to reduction to be as good or better than a conventional catalyst prepared without the sulfiding treatment but otherwise in the same manner.

EXAMPLE IV

Accelerated aging tests were conducted on catalyst samples to determine in a period of about 400 hours the stability of the catalyst. The total useful life of a platinum reforming catalyst is dependent to a great extent upon the octane level of operation, and it is ordinarily more profitable to obtain a moderate amount of reformate having an F1 clear octane above 85 than a large amount of reformate having an F1 clear octane about 70. The accelerated aging test measures the capacity of the catalyst to produce very high octane reformate for a commercially satisfactory number of months. In the 400 hour accelerated aging test at a LHSV of 3, an octane decline of not more than 5 is indicative of a catalyst having commercially satisfactory stability. The catalyst which had had the intermediate dry sulfiding treatment provided reformate at the end of the 400 hour accelerated aging test which was only 4 numbers less than initially, thus indicating excellent stability. In a still more severe accelerated aging test at 4.5 LHSV, the 350 hour octane decline was 5, thus indicating excellent stability.

EXAMPLE V

A catalyst is prepared by impregnating alumina granules with chloroplatinic acid in an amount sufficient to correspond to about 0.5% platinum, and the chloroplatinate impregnated granules are dried while being subjected to a dry nitrogen stream and being heated to 900° F. A mixture of hydrogen sulfide, sulfur vapor, carbon disulfide, and an inert gas is employed to at least partially sulfide the chloroplatinate at 950° F. The atmosphere containing the sulfiding gas is thereafter replaced by a hydrogen atmosphere, and the reduction of the platinum sulfide is conducted at a temperature of about 900° F. The finished catalyst contains about 0.5% platinum and about 0.54% chloride and contains no trace of sulfide. The catalyst possesses the advantage of producing gasoline having a higher octane than produced under similar conditions with a catalyst prepared in a similar manner, but without the intermediate sulfiding treatment.

One sample of catalyst sulfided at 950° F., although superior to conventional catalyst, provided reformate (debutanized, and consisting of pentanes and higher hydrocarbons, sometimes designated merely as C₅ plus) at a lower point on the standard yield-octane curve than provided by a catalyst sulfided at 650° F. which in turn was inferior to a catalyst sulfided at 350° F. The higher temperature sulfiding, although providing a catalyst superior to unsulfided catalyst may not be as advantageous as sulfiding at about 350° F.

EXAMPLE VI

Alumina granules having a surface area of about 80 m.²/g. are impregnated with chloroplatinic acid and are dried at room temperature by exposure to the atmosphere for a day to provide granules which feel dry and have other appearances of dryness. The dried chloroplatinate impregnated granules are subjected to hydrogen sulfide at room temperature for three hours, and thereafter treated with 100% hydrogen at a temperature of 850° F. for two hours. The thus prepared catalyst contains about 0.5% platinum and about 0.5% chloride, and is substantially free from sulfide. The catalyst is less effective in the hydrogenative reforming of gasoline than a conventional catalyst, thus establishing that an unsatisfactory catalyst results from a failure to comply with the requirement for severe drying prior to the sulfiding step of the present invention.

Measurements indicate that the drying of the impregnated granules at room conditions permits the impregnated granules to retain about 12% water, whereas drying at 270° F. for 3 hours of drying at 350° F. for 2 hours reduced the water content to less than 3%. By a series of tests, a moisture content of 1 mg./m.² of surface area is designated as the maximum moisture content of the granules subjected to sulfiding in order to attain the advantageous catalyst of the present invention.

EXAMPLE VII

Alumina pellets were leached with mild acid, rinsed, dried and impregnated with chloroplatinic acid corresponding to 0.5% platinum. While still wet from such impregnation, the pellets were treated at room temperature with hydrogen sulfide for 30 minutes. After drying at 250° F., the sulfided pellets were reduced at 650° F. in a stream consisting of 75% nitrogen and 25% hydrogen. The catalyst was compared with a similar catalyst which had not been sulfided by reforming a standard reference naphtha in the presence of 6 mols of hydrogen at 600 p. s. i. g. and 4 LHSV to obtain the following data:

Table 5

| Temperature | Unsulfided Catalyst | | Wet-Sulfided Catalyst | |
|---|---|---|---|---|
| | Octane | Yield | Octane | Yield |
| 925° F | 88.3 | 82.4 | 87.8 | 83.4 |

The comparative reforming tests demonstrated that the wet sulfiding step resulted in a catalyst inferior to the unsulfided catalyst under the test conditions and further emphasized the necessity for severe drying prior to gaseous sulfiding.

EXAMPLE VIII

Alumina granules are impreganted with chloroplatinic acid and are dried at 220° F. The amount of chloroplatinate thus impregnated into the activated alumina granules corresponds to 0.5% platinum. The impregnated and dried granules are packaged and placed in storage. The impregnated and dried granules are shipped to a reforming unit of a refinery and charged to the reactor. There the granules are subjected to the advantageous sulfiding treatment as an intermediate step of the start-up operation. A supply of dry inert gas can be circulated through the reactor during the heating of the gas to a temperature of about 350° F. The furnace heating the circulating gas is adjusted to maintain a temperature of about 350° F. throughout the bed of catalyst granules in the reactor. Hydrogen sulfide, butyl mercaptan, ethyl mercaptan, isopropyl mercaptan or other suitable sulfiding gas or a mixture of sulfiding gases is introduced into the circulating stream of inert gas. Ordinarily, it is possible to accomplish a reasonably complete sulfiding of the catalyst in the commercial unit in less than 4 hours. The catalyst bed is then purged with inert gas to remove residual sulfiding gas. Thereafter a stream consisting predominants of a reducing gas, such as hydrogen, at a temperature above 500° F., preferably about 850° F., is passed through the catalyst bed to reduce the granules. The catalyst thus produced consists essentially of 0.5% platinum, 0.5% chloride and 99% activated alumina. Such catalyst has superior performance characteristics to a similar catalyst not beneficated by the intermediate sulfiding treatment.

EXAMPLE IX

Diaminoplatinous dinitrite is prepared as an aqueous solution and employed to impregnate granules of a silica-alumina cracking catalyst. Instead of the dinitro diamino compound, an aqueous solution of platinum bis-ethylenediamine or any suitable platinum solution may be employed. After the granules are impregnated with the platinum compound, they are dried at 350° F. and treated with hydrogen sulfide at 350° F. After reduction with hydrogen at 850° F., the granules are superior for reforming gasoline to similar granules prepared without the intermediate sulfiding step.

EXAMPLE X

Molded granules of high activity synthetic silica-alumina cracking catalyst are employed in a fixed bed cracking unit until the catalyst activity has declined at least 30%, and are then impregnated with chloroplatinic acid, corresponding to 0.7% platinum and dried at 350° F. The granules subjected to hydrogen sulfide for one hour at 350° F. are superior, after 800° F. reduction, to similar granules not sulfided prior to reduction.

EXAMPLE XI

Activated alumina granules were impregnated with chloroplatinic acid and dried for 2 hours at 350° F. and treated with hydrogen at 850° F. for four hours, and thereafter treated with hydrogen sulfide at 350° F. for two hours, and then again treated with hydrogen at 800° F. for one hour. The catalyst was less effective than a catalyst which had not been treated with hydrogen sulfide, but which had otherwise been prepared in the same manner. The granules which were reduced, sulfided and again reduced provided only 5% benzene in the standard cyclohexane test, indicating that the sulfiding had poisoned the previously reduced catalyst. Such results established the necessity for conducting the sulfiding step prior to the hydrogenative treatment of the granules. Thus the reaction of hydrogen sulfide with an impregnated but not reduced granule is quite different from the reaction of hydrogen sulfide with a previously reduced granule.

Obviously many modifications and variations of the invention as hereinbefore set forth may be made without departing from the spirit and scope thereof and therefore only such limitations should be imposed as are indicated in the appended claims.

The invention claimed is:

1. In the method of preparing dual-function reforming catalyst granules consisting of from 0.1 to 2% platinum on a carrier having a controlled acidic function distributed over a large surface area in excess of 5 m.$^2$/g., said carrier being selected from the group consisting of silica-alumina and alumina, in which method granular particles of a large surface area carrier are impregnated with chloroplatinic acid and in which thereafter a hydrogen-containing gas stream is employed at an elevated temperature for forming catalyst granules comprising metallic platinum distributed on a large surface area carrier, the improvement which includes the steps of: subjecting granules impregnated with chloroplatinic acid to a drying treatment sufficiently severe to reduce the water content below 1 mg./m.$^2$ of surface area; subjecting the thus dried, impregnated granules to a gaseous sulfiding agent in an amount in excess of one sixth of the weight of the platinum content of the graules and in the substantial absence of steam and whereby at least a portion of the chloroplatinate is sulfided; and thereafter subjecting the thus sulfided granular particles to a hydrogen-containing gas stream at a temperature within the range from 500° F. to 1000° F. to form catalyst granules comprising metallic platinum distributed in said large surface area carrier, said catalyst granules possessing enhanced activity in the reforming of gasoline by reason of said drying, gaseous sulfiding, and reducing treatments.

2. The method of preparing catalyst granules effective for both isomerization and dehydrogenation of hydrocarbons comprising the steps of: calcining an aluminaceous material to form a large surface area activated alumina having a surface area in excess of 40 square meters per gram and a water content less than ½ mol of water per mol of alumina; subjecting granular particles of said activated alumina to a mild acid leaching dissolving less than 10% of the alumina; rinsing and drying the leached granules; subjecting the dried granules to an aqueous solution of chloroplatinic acid to impregnate into the activated alumina granules a quantity of chloroplatinic acid corresponding to from 0.1 to 2% platinum; drying the impregnated alumina granules to remove adsorbed water at a temperature above 220° F. whereby the moisture content is reduced below 40 mg./g.; subjecting the impregnated, dried granules at a temperature between 220° F. and 1000° F. to an atmosphere comprising an inert gas and containing hydrogen sulfide as the only reactant gas, the amount of hydrogen sulfide being in excess of one-sixth the weight of platinum in the granules, whereby at least a portion of the impregnated chloroplatinic acid is sulfided; and subjecting the thus sulfided granules to an atmosphere consisting predominantly of hydrogen and having a hydrogen to hydrogen sulfide ratio of at least 20 and 1 at a temperature within the range from 500° to 1000° F. to form granules in which a catalytically active form of metallic platinum and a catalytically active form of chloride are distributed in the activated alumina granules.

References Cited in the file of this patent

UNITED STATES PATENTS

| | | |
|---|---|---|
| 2,566,521 | Haensel | Sept. 4, 1951 |
| 2,582,428 | Haensel | Jan. 15, 1952 |
| 2,623,860 | Haensel | Dec. 30, 1952 |
| 2,667,461 | Guyer et al. | Jan. 26, 1954 |
| 2,723,243 | Holden | Nov. 8, 1955 |
| 2,739,945 | Thorn et al. | Mar. 27, 1956 |

FOREIGN PATENTS

| | | |
|---|---|---|
| 507,989 | Belgium | Jan. 15, 1952 |